United States Patent
Harrison et al.

(10) Patent No.: US 9,864,454 B2
(45) Date of Patent: *Jan. 9, 2018

(54) METHOD AND APPARATUS FOR CLASSIFYING FINGER TOUCH EVENTS ON A TOUCHSCREEN

(71) Applicant: QEEXO, CO., San Jose, CA (US)

(72) Inventors: Christopher Harrison, Pittsburgh, PA (US); Julia Schwarz, Pittsburgh, PA (US); Robert Xiao, Pittsburgh (CA)

(73) Assignee: QEEXO, CO., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/612,089

(22) Filed: Feb. 2, 2015

(65) Prior Publication Data
US 2016/0026320 A1 Jan. 28, 2016

Related U.S. Application Data

(63) Continuation of application No. 13/849,698, filed on Mar. 25, 2013, now Pat. No. 9,013,452.

(51) Int. Cl.
*G06F 3/041* (2006.01)
*G06F 3/0488* (2013.01)
(Continued)

(52) U.S. Cl.
CPC ............ *G06F 3/0416* (2013.01); *G06F 3/043* (2013.01); *G06F 3/0482* (2013.01); *G06F 3/0488* (2013.01); *G06F 3/04842* (2013.01)

(58) Field of Classification Search
CPC ...... G06F 3/041; G06F 3/0412; G06F 3/0414; G06F 3/0416; G06F 3/042; G06F 3/0421;
(Continued)

(56) References Cited

U.S. PATENT DOCUMENTS 6,933,930 B2 * 8/2005 Devige ............... G06F 3/0433
178/18.04
9,013,452 B2 * 4/2015 Harrison ............. G06F 3/0488
345/177
(Continued)

FOREIGN PATENT DOCUMENTS

JP 2004-213312 A 7/2004
KR 10-2002-0075283 A 10/2002
WO 2006-070044 A1 7/2006

OTHER PUBLICATIONS

Asano, Futoshi, Goto, Masataka, Itou, Katunobu, Asoh, Hideki; Real-Time Sound Source Localization and Separation System and Its Application to Automatic Speech Recognition; Proceedings of Eurospeech, 2001; p. 1013-1016; 2001.
(Continued)

*Primary Examiner* — Tom Sheng
(74) *Attorney, Agent, or Firm* — IPV Law Group; David N. Tran

(57) ABSTRACT

A system for classifying touch events includes a touch screen configured to display an interactive element, one or more vibro-acoustic sensors coupled to the touch screen, a touch event detector configured to monitor the one or more vibro-acoustic sensors and to save vibro-acoustic signals sensed by the one or more vibro acoustic sensors, wherein the touch event detector is further configured to detect touch events in which the interactive element is touched by a first or a second finger part of a user, and wherein the touch events result in generating the vibro-acoustic signals, and a vibro-acoustic classifier configured to classify the vibro-acoustic signals.

18 Claims, 14 Drawing Sheets

(51) Int. Cl.
 G06F 3/0484 (2013.01)
 G06F 3/043 (2006.01)
 G06F 3/0482 (2013.01)

(58) Field of Classification Search
 CPC ...... G06F 3/0425; G06F 3/0428; G06F 3/043;
  G06F 3/0433; G06F 3/0436; G06F 3/044;
  G06F 3/045; G06F 3/046; G06F 3/047;
  G06F 3/048; G06F 3/0481; G06F 3/0482;
  G06F 3/0484; G06F 3/04842; G06F
  3/04845; G06F 3/04847; G06F 3/0485;
  G06F 3/0486; G06F 3/0487; G06F
  3/0488; G06F 3/03547
 USPC ........................ 345/173, 174, 175, 176, 177;
  178/18.01–18.09
 See application file for complete search history.

(56) References Cited

U.S. PATENT DOCUMENTS

| | | | |
|---|---|---|---|
| 9,019,244 B2 | 4/2015 | Harrison | |
| 9,612,689 B2* | 4/2017 | Harrison | G06F 3/043 |
| 2003/0217873 A1* | 11/2003 | Paradiso | G06F 3/0433 178/18.04 |
| 2005/0083313 A1 | 4/2005 | Hardie-Bick et al. | |
| 2010/0279738 A1* | 11/2010 | Kim | G06F 3/016 455/566 |
| 2011/0018825 A1* | 1/2011 | Kondo | G06F 3/0433 345/173 |
| 2011/0248927 A1* | 10/2011 | Michaelis | G06F 3/04845 345/173 |
| 2014/0240295 A1 | 8/2014 | Harrison | |
| 2014/0267065 A1* | 9/2014 | Levesque | G06F 3/016 345/173 |
| 2014/0327626 A1 | 11/2014 | Harrison et al. | |
| 2015/0035759 A1 | 2/2015 | Harrison et al. | |
| 2015/0242009 A1 | 8/2015 | Xiao et al. | |
| 2016/0077615 A1 | 3/2016 | Schwarz et al. | |
| 2016/0077664 A1 | 3/2016 | Harrison et al. | |
| 2016/0085324 A1 | 3/2016 | Schwarz et al. | |
| 2016/0085333 A1 | 3/2016 | Christopher | |
| 2016/0085372 A1 | 3/2016 | Munemoto et al. | |
| 2016/0098185 A1 | 4/2016 | Xiao et al. | |
| 2016/0224145 A1 | 8/2016 | Harrison et al. | |
| 2016/0231865 A1 | 8/2016 | Harrison et al. | |
| 2016/0299615 A1 | 10/2016 | Schwarz et al. | |
| 2017/0024892 A1 | 1/2017 | Harrison et al. | |
| 2017/0060279 A1 | 3/2017 | Harrison | |

OTHER PUBLICATIONS

Benko, Hrvoje, Wilson, Andrew, Balakrishnan, Ravin; Sphere: Multi-Touch Interactions on a Spherical Display; Proceedings of UIST, 2008; pp. 77-86; 2008.
Burges, Christopher; A Tutorial on Support Vector Machines for Pattern Recognition; Data Mining and Knowledge Discovery, 2; pp. 121-167; 1998.
Cao, Xiang, Wilson, Andrew, Balakrishnan, Ravin, Hinckley, Ken, Hudson, Scott; ShapeTouch: Leveraging Contact Shape on Interactive Surfaces; IEEE International Workshop on Horizontal Interactive Human Computer System (TABLETOP); pp. 139-146; 2008.
Deyle, Travis, Palinko, Szabolcs, Poole, Erika Shehan, Starner, Thad; Hambone: A Bio-Acoustic Gesture Interface; Proceedings of ISWC, 2007; pp. 1-8; 2007.
Dietz, Paul, Harsham, Bret, Forlines, Clifton, Leigh, Darren, Yerazunis, William, Shipman, Sam, Schmidt-Nielsen, Bent, Ryall, Kathy; DT Controls: Adding Identity to Physical Interfaces; ACM Symposium on User Interface Software & Technology (UIST); pp. 245-252; 2005.
Dietz, Paul, Leigh, Darren; DiamondTouch: A Multi-User Touch Technology; ACM Symposium on User Interface Software & Technology (UIST); pp. 219-226; 2001.
Gutwin, Carl, Greenberg, Saul, Blum, Roger, Dyck, Jeff, Tee, Kimberly, McEwan, Gregor; Supporting Informal Collaboration in Shared-Workspace Groupware; Journal of Universal Computer Science, 14(9); pp. 1411-1434; 2008.
Hall, Mark, Frank, Eibe, Holmes, Geoffrey, Pfahringer, Bernhard, Reutemann, Peter, Witten, Ian; The WEKA Data Mining Software: An Update; SIGKDD Explorations, 11(1); pp. 10-18; 2009.
Harrison, Chris, Tan, Desney, Morris, Dan; Skinput: Appropriating the Body as an Input Surface; Proceedings of CHI, 2010; pp. 453-462; 2010.
Harrison, Chris, Hudson, Scott; Scratch Input: Creating Large, Inexpensive, Unpowered and Mobile Finger Input Surfaces; Proceedings of UIST, 2008; pp. 205-208; 2008.
Hartmann Bjorn, Ringel Morris, Meredith, Benko, Hrvoje, Wilson, Andrew; Augmenting Interactive Tables with Mice & Keyboards; Proceedings of UIST, 2009; pp. 149-152; 2009.
Hinckley, Ken, Song, Hyunyoung; Sensor Synaesthesia: Touch in Motion, and Motion in Touch; Proceedings of CHI, 2011; pp. 801-810; 2011.
Hinckley, Ken, Yatani, Koji, Pahud, Michel, Coddington, Nicole, Rodenhouse, Jenny, Wilson, Andy, Benko, Hrvoje, Buxton, Bill; Pen+Touch=New Tools; Proceedings of UIST, 2010; pp. 27-36; 2010.
Hinkley, Ken, Yatani, Koji, Pahud, Michel, Coddington, Nicole, Rodenhouse, Jenny, Wilson, Andy, Benko, Hrvoje, Buxton, Bill; Manual Deskterity: An Exploration of Simultaneous Pen + Touch Direct Input; Proceedings of Chi, 2010; pp. 2793-2802; 2010.
Holz, Christian, Baudisch, Patrick; the Generalized Perceived Input Point Model and How to Double Touch Accuracy by Extracting Fingerprints; Proceedings of CHI, 2010; pp. 581-590; 2010.
Kaltenbrunner, Martin, Bencina, Ross; reacTIVision: A Computer-Vision Framework for Table-Based Tangible Interaction; Proceedings of TEI, 2007; pp. 69-74; 2007.
Matsushita, Nobuyuki, Rekimoto, Jun; HoloWall: Designing a Finger, Hand, Body, and Object Sensitive Wall; Proceedings of UIST, 1997; pp. 209-210; 1997.
Olwal, Alex, Wilson, Andrew; SurfaceFusion: Unobtrusive Tracking of Everyday Objects in Tangible User Interfaces; Proceedings of GI, 2008; pp. 235-242; 2008.
Paradiso, Joseph, Leo, Che King; Tracking and Characterizing Knocks Atop Large Interactive Displays; Sensor Review, 25(2); pp. 134-143; 2005.
Paradiso, Joseph, Hsiao, Kai-yuh, Strickon, Joshua, Lifton, Joshua, Adler, Ari; Sensor Systems for Interactive Surfaces; IBM Systems Journal, 39(3-4); pp. 892-914; 2000.
Patten, James, Ishii, Hiroshi, Hines, Jim, Pangaro, Gian; Sensetable: A Wireless Object Tracking Platform for Tangible User Interfaces; Proceedings of CHI, 2001; pp. 253-260; 2001.
Rekimoto, Jun, Saitoh, Masanori; Augmented Surfaces: A Spatially Continuous Work Space for Hybrid Computing Environments; Proceedings of CHI, 1999; pp. 378-385; 1999.
Rekimoto, Jun, Sciammarella, Eduardo; ToolStone: Effective use of the Physical Manipulation Vocabularies of Input Devices; Proceedings of UIST, 2000; pp. 109-117; 2000.
Rekimoto, Jun; SmartSkin: An Infrastructure for Freehand Manipulation on Interactive Surfaces; Proceedings of CHI, 2002; pp. 113-120; 2002.
Vandoren, Peter, Van Laerhoven, Tom, Claesen, Luc, Taelman, Johannes, Di Fiore, Fabian, Van Reeth, Frank, Flerackers, Eddy; DIP-IT: Digital Infrared Painting on an Interactive Table; Proceedings of CHI, 2008; pp. 2901-2906; 2008.
Wang, Feng, Ren, Xiangshi; Empirical Evaluation for Finger Input Properties in Multi-Touch Interaction; Proceedings of CHI, 2009; pp. 1063-1072; 2009.
International Search Report and Written Opinion for PCT/US2012/060865; dated Mar. 29, 2013.
Non-Final Office Action—dated Mar. 13, 2015—U.S. Appl. No. 13/958,427, filed Mar. 23, 2013, titled: "Capture of Vibro-Acoustic Data Used to Determine Touch Types".
Final Office Action—dated Jun. 19, 2015—U.S. Appl. No. 13/958,427, filed Mar. 23, 2013, titled: "Capture of Vibro-Acoustic Data Used to Determine Touch Types".

(56) References Cited

OTHER PUBLICATIONS

Non-Final Office Action—dated Apr. 6, 2015—U.S. Appl. No. 13/887,711, filed May 6, 2013, titled: "Using Finger Touch Types to Interact With Electronic Devices".
Final Office Action—dated Aug. 7, 2015—U.S. Appl. No. 14/191,329, filed Feb. 26, 2014, titled: "Using Capacitive Images for Touch Type Classification".
Non-Final Office Action—dated Oct. 1, 2015—U.S. Appl. No. 14/492,604, filed Sep. 22, 2014, titled: "Method and Apparatus for Improving Accuracy of Touch Screen Event Analysis by Use of Edge Classification".
International Search Report and Written Opinion received for PCT Application No. PCT/US2014/049485 dated Nov. 17, 2014.
International Search Report and Written Opinion received for PCT Application No. PCT/US2014/033380 dated Mar. 13, 2015.
International Search Report and Written Opinion received for PCT Application No. PCT/US2014/034977 dated Sep. 18, 2014.
Non-Final Office Action—dated Oct. 7, 2015—U.S. Appl. No. 14/495,041, filed Sep. 24, 2014, titled: "Method for Improving Accuracy of Touch Screen Event Analysis by Use of Spatiotemporal Touch Patterns".
Non-Final Office Action—dated Oct. 2, 2015—U.S. Appl. No. 14/486,800, filed Sep. 15, 2014, titled: "Method and Apparatus for Resolving Touch Screen Ambiguities".
Non-Final Office Action—dated Apr. 19, 2017—U.S. Appl. No. 14/869,998, filed Sep. 30, 2015, titled: "Determining Pitch and Yaw for Touchscreen Interactions."
Final Office Action—dated Dec. 20, 2016—U.S. Appl. No. 15/073,407, filed Mar. 17, 2016, titled: "Input Tools Having Viobro-Acoustically Distinct Regions and Computing Device for Use With the Same."
Non-Final Office Action—dated Nov. 10, 2016—U.S. Appl. No. 13/958,427, filed Aug. 2, 2013, titled: "Capture of Vibro-Acoustic Data Used to Determine Touch Types."
Final Office Action—dated Aug. 26, 2016—U.S. Appl. No. 14/219,919, filed Mar. 19, 2014, titled: "Method and Device for Sensing Touch Input."
Non-Final Office Action—dated Feb. 2, 2017—U.S. Appl. No. 14/191,329, filed Feb. 26, 2014, titled: "Using Capacitive Images for Touch Type Classification."
Final Office Action—dated Jun. 8, 2017—U.S. Appl. No. 13/887,711, filed May 6, 2013, titled: "Using Finger Touch Types to Interact With Electronic Devices."
Non-Final Office Action—dated Apr. 21, 2017—U.S. Appl. No. 15/075,648, filed Mar. 21, 2016, titled: "Method and Apparatus for Differentiating Touch Screen Users Based on Touch Event Analysis."
Non-Final Office Action—dated Dec. 1, 2016—U.S. Appl. No. 14/486,800, filed Sep. 15, 2014, titled: "Method and Apparatus for Resolving Touch Screen Ambiguities."
Non-Final Office Action—dated Mar. 17, 2017—U.S. Appl. No. 14/492,604, filed Sep. 22, 2014, titled: "Method and Apparatus for Improving Accuracy of Touch Screen Event Analysis by Use of Edge Classification."
Non-Final Office Action—dated Nov. 25, 2016—U.S. Appl. No. 14/495,041, filed Sep. 24, 2014, titled: "Imethod for Improving Accuracy of Touch Screen Event Analysis by Use of Spatiotemporal Touch Patterns."
Non-Final Office Action—dated May 16, 2017—U.S. Appl. No. 14/503,894, filed Oct. 1, 2014, titled: "Method and Apparatus for Addressing Touch Discontinuities."
Final Office Action—dated Jan. 18, 2017—U.S. Appl. No. 14/684,407, filed Apr. 12, 2015, titled: "Method and Apparatus for Classifying Contacts With a Touch Sensitive Device."
Final Office Action—dated May 1, 2017—U.S. Appl. No. 14/834,434, filed Aug. 24, 2015, titled: "Touch Sensitive Devicewith Multi-Sensor Stream Synchronized Data."
Non-Final Office Action—dated Jun. 13, 2016—U.S. Appl. No. 14/751,589, filed Jun. 26, 2015, titled: "Method and Apparatus for Classifying a Touch Event on a Touch Screen as Related to One of Multiple Function Generating Interaction Layers and Activating a Function in the Selected Interaction Layer."
International Search Report and Written Opinion for PCT/US2016/044552; dated Oct. 17, 2016.
International Search Report and Written Opinion for PCT/US2016/040194; dated Sep. 19, 2016.
International Search Report and Written Opinion for PCT/US2015/051355; dated Dec. 15, 2015.
International Search Report and Written Opinion for PCT/US2015/051582; dated Feb. 26, 2016.
International Search Report and Written Opinion for PCT/US2015/051106; dated Jan. 28, 2016.
International Search Report and Written Opinion for PCT/US2015/050570; dated Dec. 17, 2015.
International Search Report and Written Opinion for PCT/US2015/047616; dated Jul. 1, 2016.
International Search Report and Written Opinion for PCT/US2015/047428; dated Nov. 27, 2015.
International Search Report and Written Opinion for PCT/US2015/014581; dated May 14, 2015.
European Patent Office Extended Search Report for EP 14 83 2247; dated Feb. 23, 2017.
European Patent Office Extended Search Report for EP 14 79 4212; dated Nov. 9, 2016.

* cited by examiner

METHOD AND APPARATUS FOR CLASSIFYING FINGER TOUCH EVENTS ON A TOUCHSCREEN

CROSS-REFERENCE TO RELATED APPLICATION

This application is a continuation of application Ser. No. 13/849,698 filed on Mar. 25, 2013 having the title "METHOD AND SYSTEM FOR ACTIVATING DIFFERENT INTERACTIVE FUNCTIONS USING DIFFERENT TYPES OF FINGER CONTACTS."

TECHNICAL FIELD

The present invention relates to classifying touch events, and more particularly, to a method and system for classifying vibro-acoustic signals to identify a finger part used to touch an interactive element displayed on a touch screen.

BACKGROUND ART

Many technologies exist that have the ability to digitize different types of input. There are two main touch sensing approaches: active and passive. The key downside of active approaches is that an explicit object must be used (e.g., a special pen), which is implemented with electronics (and potentially batteries). For example, pens augmented with infrared light emitters on their tips can be used on the commercially available Microsoft Surface. There have also been efforts to move beyond pens, including, e.g., infrared-light-emitting brushes for painting applications. Current systems generally do not attempt to discriminate among different pens (just perhaps pen from finger input). Variably-modulated infrared light enables identification, but requires specialized hardware. Additionally, ultrasonics can be used for input localization, and can provide pen ID as well. Capacitive coupling allows users or objects to be localized and identified, though this typically requires grounding plates or a physical connection to function.

Sensing based on electromagnetic resonance, another method, operates between active and passive. Although the tools and tangibles need not be powered, they contain a resonant coil that is excited by proximate EM fields, generated by the specialized tablet they operate on. It is also possible to support object identification through a combination of RFID and vision processing, which offers greater scalability.

Fiducial markers are a truly passive approach. They provide the ID of an object through a uniquely patterned tag—often in a sticker form factor. This method has been shown to be very capable—the only major drawback is the size of the marker, which in general, prevents placement on small surfaces like the tip of a pen. Fiducial markers can also work in a capacitive-sensing manner, allowing tags to be embedded in an object. Additionally, the shape of an object can be captured optically and used for classification (e.g., mice and keyboards).

In general, the aforementioned techniques require instrumentation of the object providing input, which is problematic for fingers (i.e., people do not like to wear things on their fingers and hands). Researchers have also looked at wrist-mounted acoustic sensors that can classify finger-on-finger actions, such as pinching or flicking Finger taps can also be localized on the body through acoustic fingerprinting.

However, the latter systems require sensors to be placed on the user. Without instrumentation, some areas of the finger can be determined through computer vision (e.g., pad vs. tip). Using accelerometers or acoustics, soft and hard taps can be discriminated.

Contemporary interactive surfaces generally treat finger touches as a single class of input (a partial exception to this are finger-print scanning systems, which can capture a high-resolution fingerprint image to infer the 3D "posture" of a finger; also, area of contact via optical or capacitive sensing can be considered an extra input dimension). However, this is a gross simplification—fingers are diverse appendages, both in their motor capabilities and their anatomical composition. Supporting additional dimensions of finger input have largely been ignored because instrumenting the user with active or passive components is invasive.

At present, in order for a finger to perform different operations at a single point in space on a touch screen, it must be overloaded. Most common is a tap-and-hold period, or chording of the fingers (e.g., two-finger-tap for right click). This can trigger a transient contextual menu, which allows a user to select one of several actions. An alternative to finger overloading is breaking function out into one or more buttons. For example, there is a scheme in which one button is for minimizing a window and another button is for closing it. However, this is problematic for mobile devices with limited screen real estate.

Currently, touch screens do not distinguish between different types of finger contacts. For example, touching with the tip of the finger and touching with the knuckle are treated the same. As such, all finger touches have the same interactive outcome.

SUMMARY

In view of the above, the present invention provides a method and system for activating different interactive functions based on a classification of vibro-acoustic signals. In accordance with an aspect of the present invention, there is provided a system for classifying touch events, the system comprises a touch screen configured to display an interactive element; one or more vibro-acoustic sensors coupled to the touch screen; a touch event detector configured to monitor the one or more vibro-acoustic sensors and to save vibro-acoustic signals sensed by the one or more vibro acoustic sensors, wherein the touch event detector is further configured to detect touch events in which the interactive element is touched by a first or a second finger part of a user, and wherein the touch events result in generating the vibro-acoustic signals; and a vibro-acoustic classifier configured to classify the vibro-acoustic signals.

BRIEF DESCRIPTION OF THE DRAWINGS

The above and other objects and features of the present invention will become apparent from the following description of an exemplary embodiment given in conjunction with the accompanying drawings, in which.

DETAILED DESCRIPTION

The advantages and features of exemplary embodiments and methods of accomplishing these will be clearly understood from the following embodiments taken in conjunction with the accompanying drawings. However, the exemplary embodiments are not limited and may be implemented in various forms. It should be noted that the exemplary embodiments are provided to make a full disclosure and also to allow those skilled in the art to understand the full range of the exemplary embodiments. Therefore, the exemplary embodiments are to be defined only by the scope of the appended claims.

FIGS. 1A to 4B are exemplary diagrams illustrating a concept of activating different interactive functions based on a classification of vibro-acoustic signals in accordance with an exemplary embodiment of the present invention;

In brief, the concept of the present invention may be described as follow. A user touches or contacts a touch screen with one of the finger parts, e.g., a finger tip. Such a touch event triggers a primary or conventional functionality, such as opening a file, dragging a file, launching an application, selecting a song, pressing a button, and the like. When a user touches the touch screen with another one of the finger parts, e.g., a knuckle or fingernail, an auxiliary function is launched on the same touch screen.

Although one or more exemplary embodiments explain and illustrate that a finger tip causes to activate a primary function and a knuckle or fingernail causes to activate an auxiliary function, the embodiments do not limit thereto. It should be noted that different combination of these finger parts or the use of other finger parts can also activate the primary and auxiliary functions.

Figure 1A:
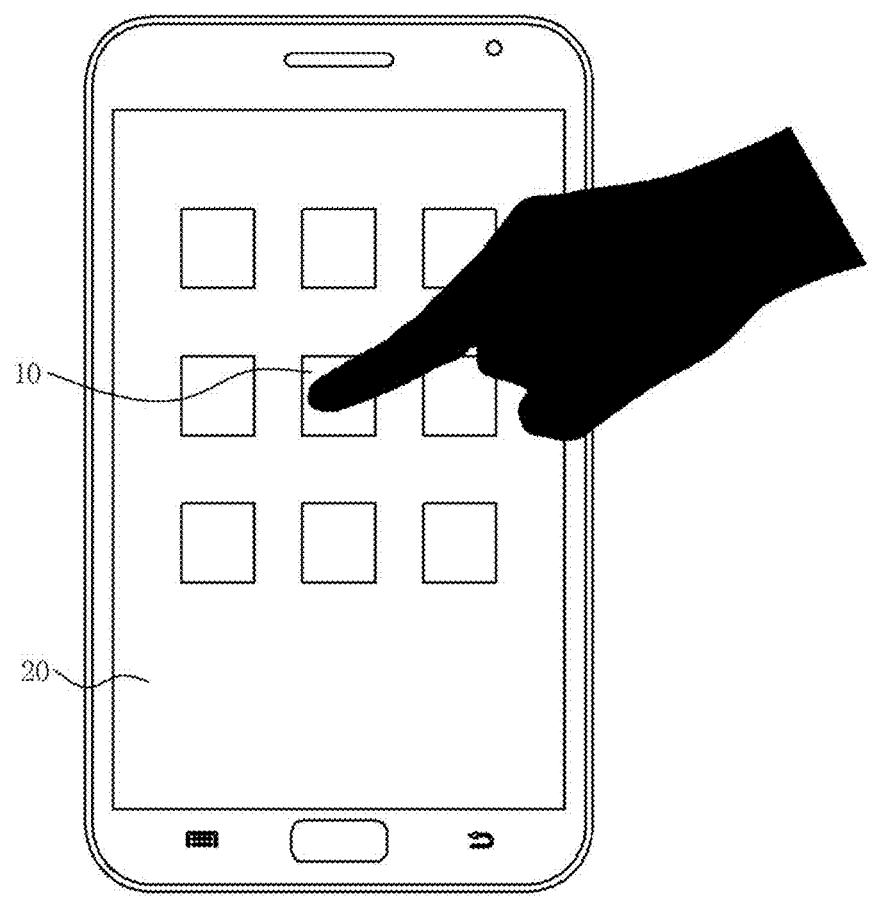
FIGS. 1A to 4B are exemplary diagrams illustrating a concept of activating different interactive functions based on a classification of vibro-acoustic signals in accordance with an exemplary embodiment of the present invention.

First, FIG. 1A illustrates one exemplary diagram that a fingertip is used to trigger a primary or conventional function.

As shown in FIG. 1A, when a user touches an interactive element 10 on a touch screen 20 with a fingertip, a primary or conventional function is triggered. The term of "interactive element" used herein may refer to a user interface such as an icon or a graphical object representing applications or services designed to activate a specific function related thereto. The specific function, for example, may include such actions opening, dragging, launching, selecting, or pressing a photo, a file, a text, an image, an application, a song, a button, a game, an in-game character or the like through the use of the applications or services.

Figure 1B:
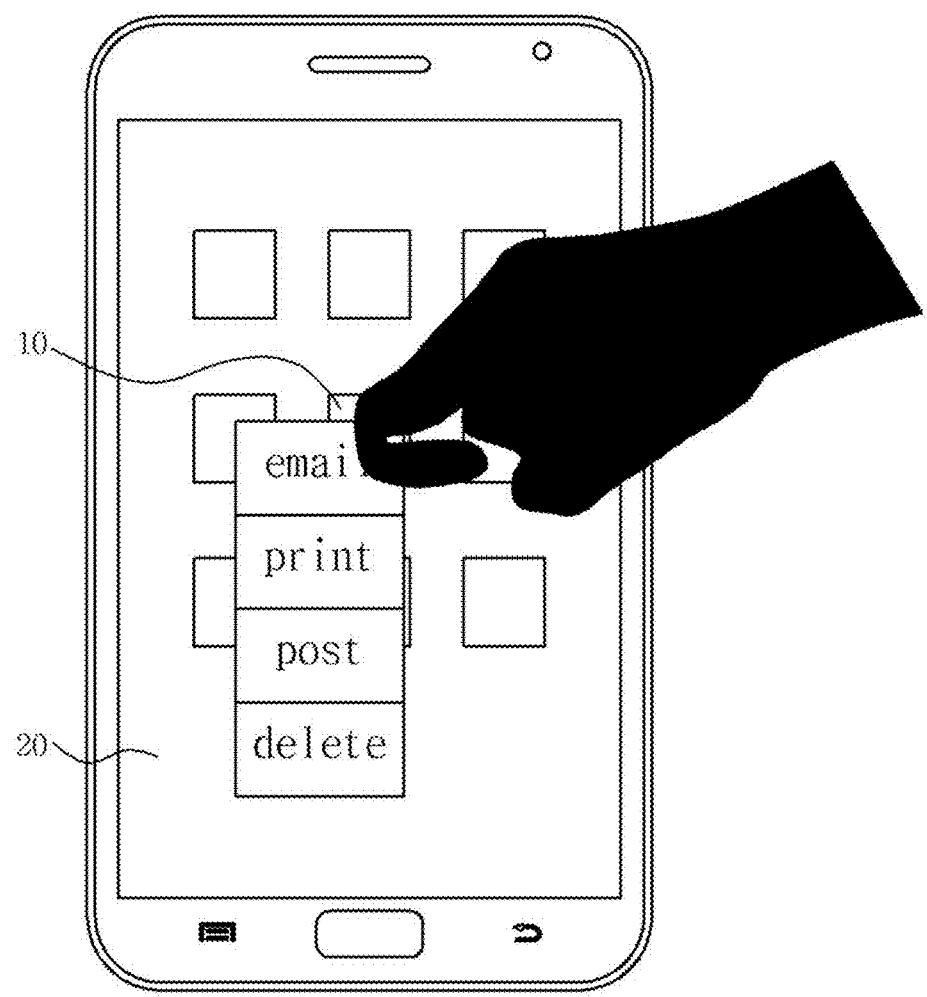
Figure 1C:
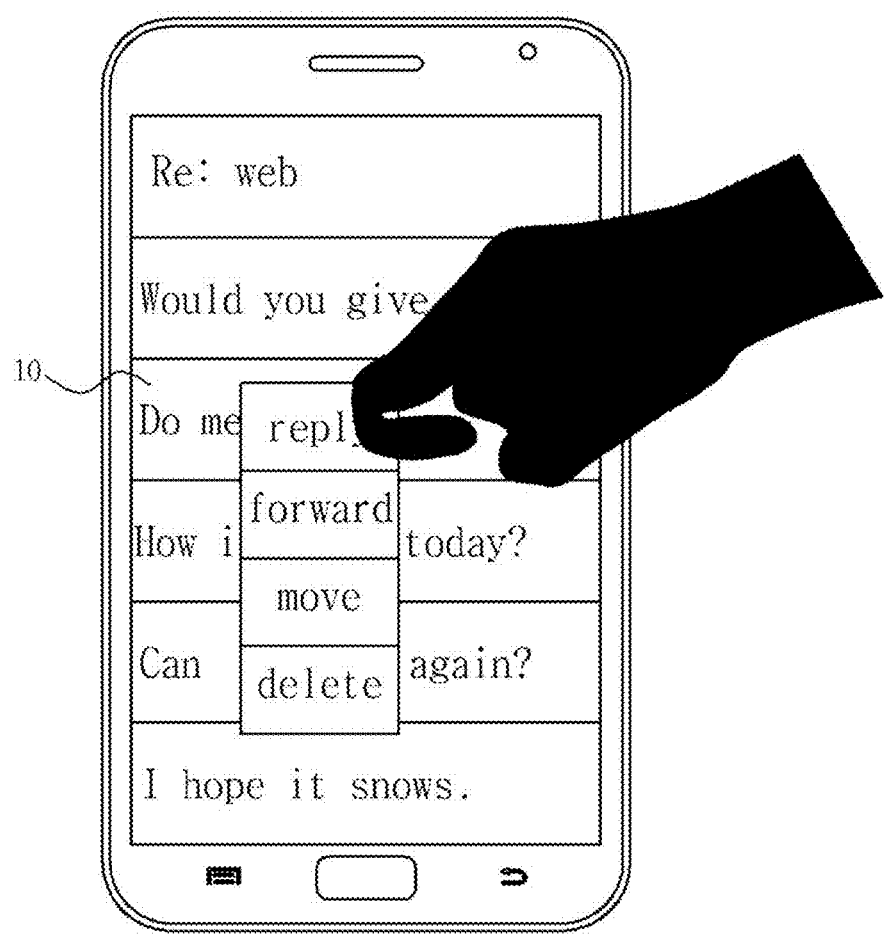

FIGS. 1B and 1C illustrate exemplary diagrams that a knuckle or fingernail is used to activate an auxiliary function such as a pop-up of context menus.

Referring to FIG. 1B, a fingertip may be used to scroll (i.e., translate a display window) as seen in contemporary touch interfaces. When a knuckle or fingernail touches an interactive element 10 on a touch screen 20, e.g., a photo, a contextual pop-up menu could appear with the following options: email, print, post, delete and the like. As another example, as shown in FIG. 1C, when a knuckle or fingernail touches an interactive element 10, e.g., an opened email, a context menu could appear with the following options: reply, forward, move, delete, and the like.

Figure 2A:
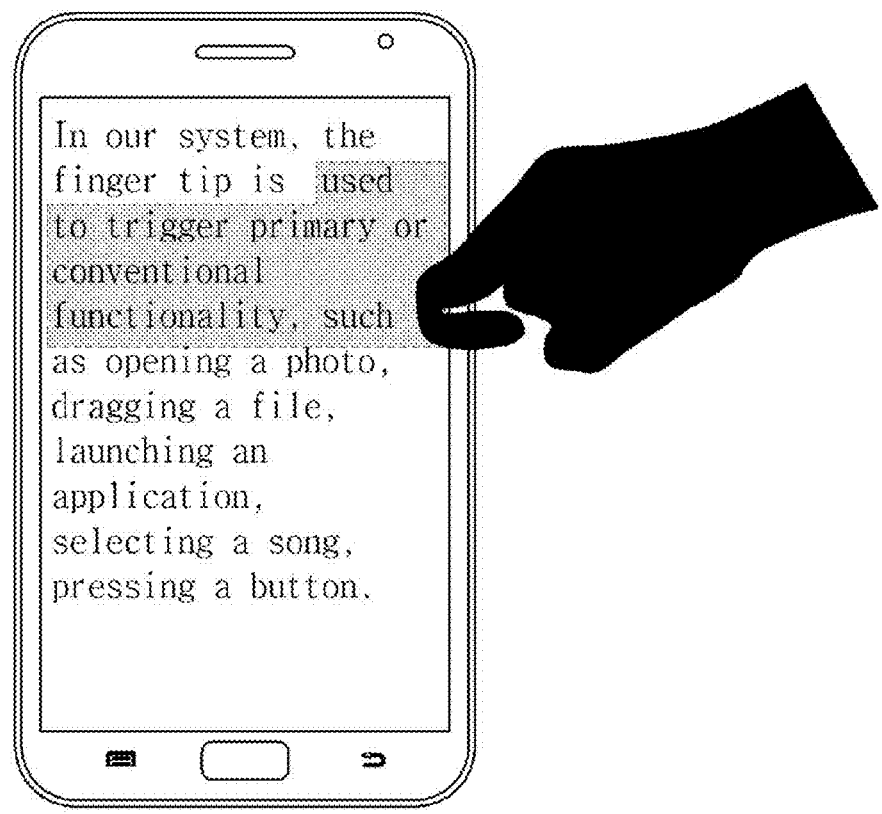
Figure 2B:
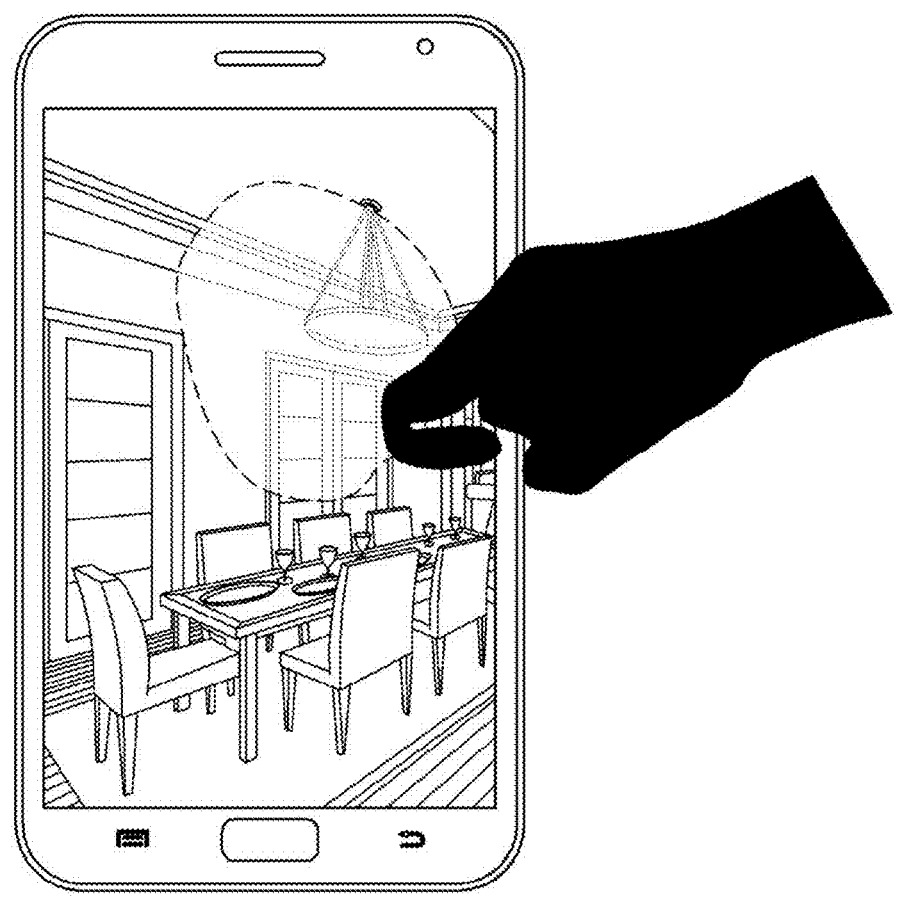
Figure 2C:
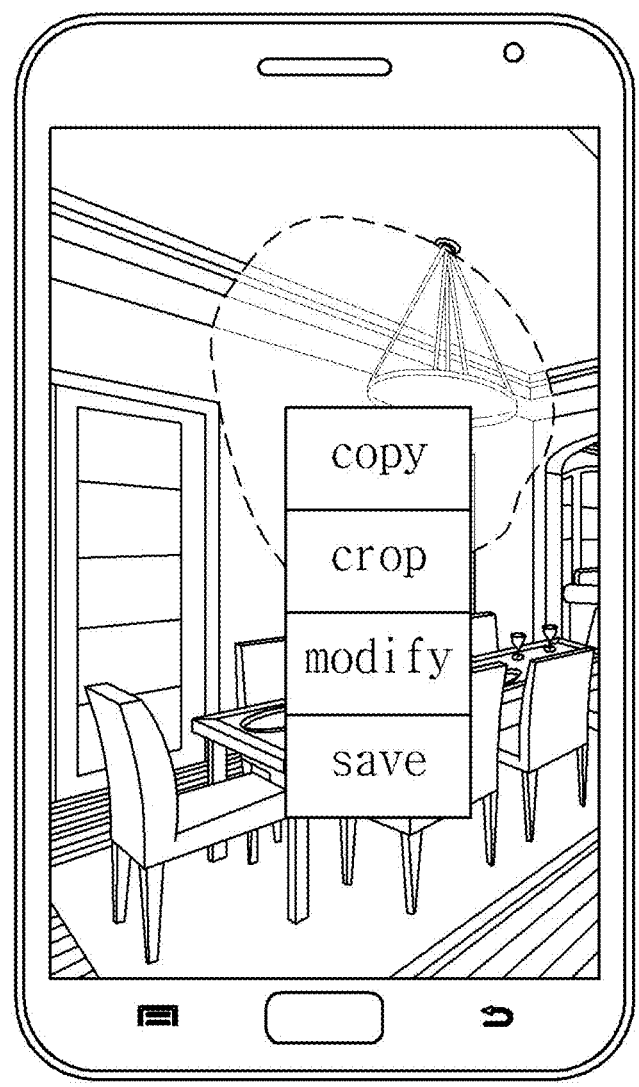

FIGS. 2A, 2B and 2C illustrate exemplary diagrams that the knuckle or fingernail can be used for interactions requiring selection.

In FIG. 2A, one exemplary embodiment includes a selection of text. A fingertip may be used to scroll (i.e., translate a display window) as seen in contemporary touch interfaces. Using a knuckle or fingernail, a user may touch and drag over a region of text to select the text. As another example, using a knuckle or fingernail, a user may touch and drag over a region of text to paint the text in a special color (e.g., a highlighting tool).

In FIG. 2B, using a knuckle or fingernail, a user may touch and drag over a region of an image to lasso select an arbitrary shaped sub-region of the image or a user may touch and drag over a region of an image to select a rectangular sub-region of the image. Finally, upon completion of this selection action, a context menu could automatically appear. For example, as illustrated in FIG. 2C, following an image region selection, a context menu could appear with the following options: copy, crop, modify, save, etc. As another example, following a text selection, a context menu could appear with the following options: copy, cut, paste, search, delete, etc.

Figure 3A:
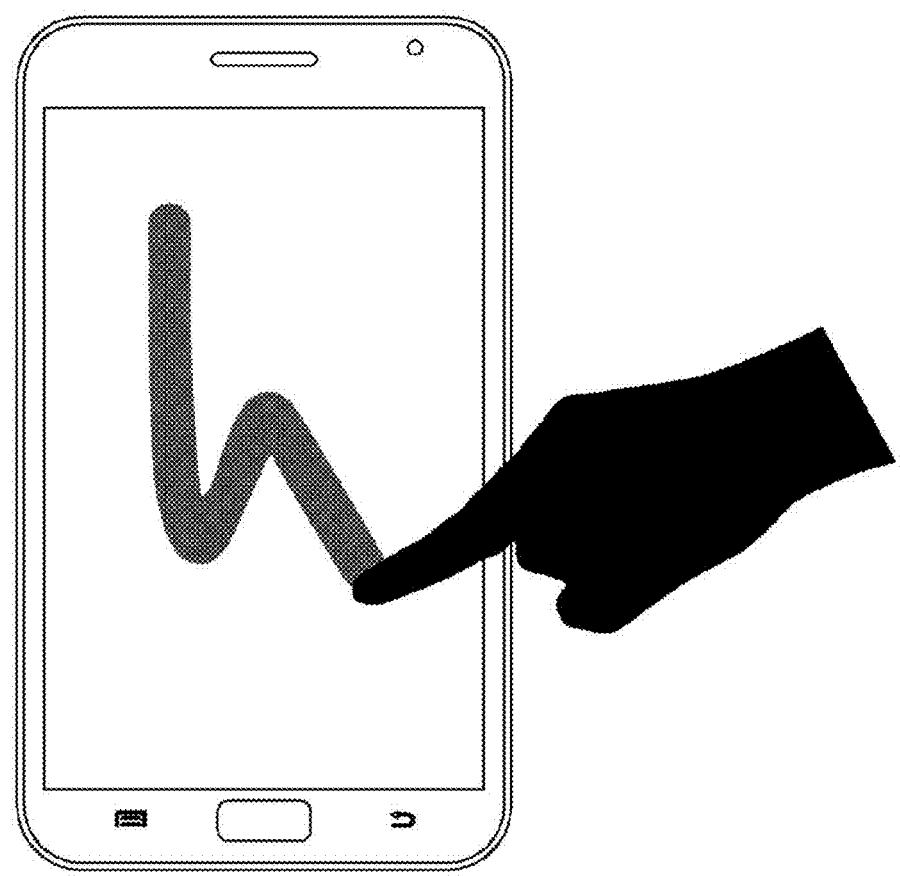
Figure 3B:
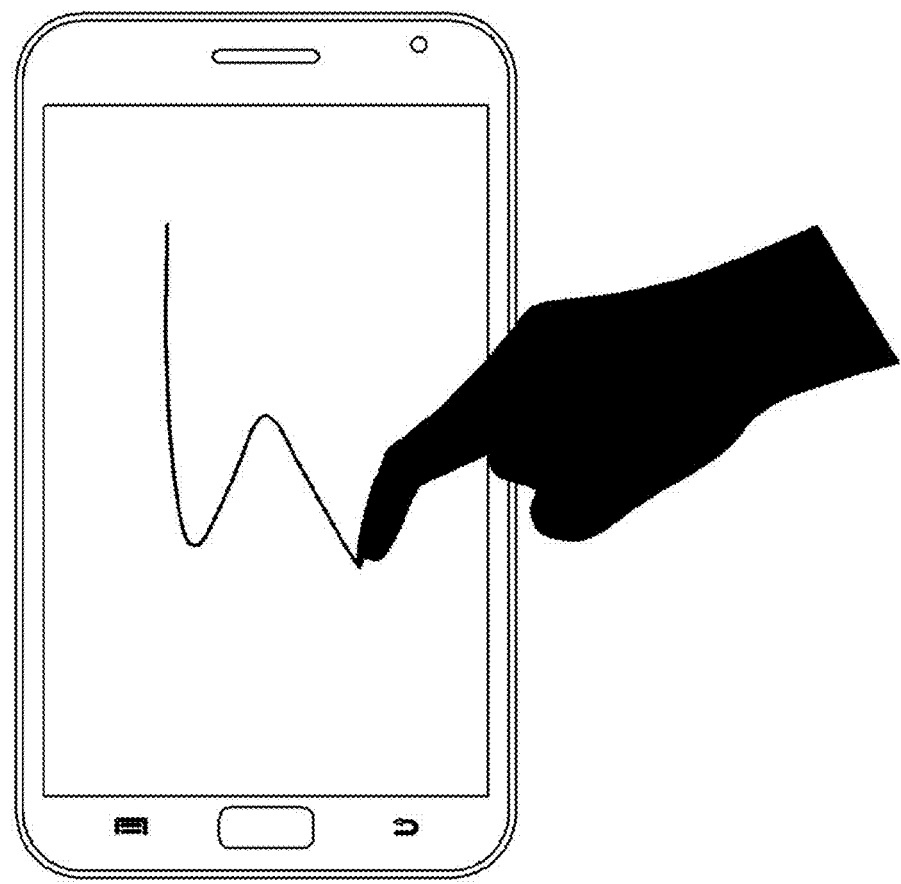
Figure 3C:
Figure 3D:
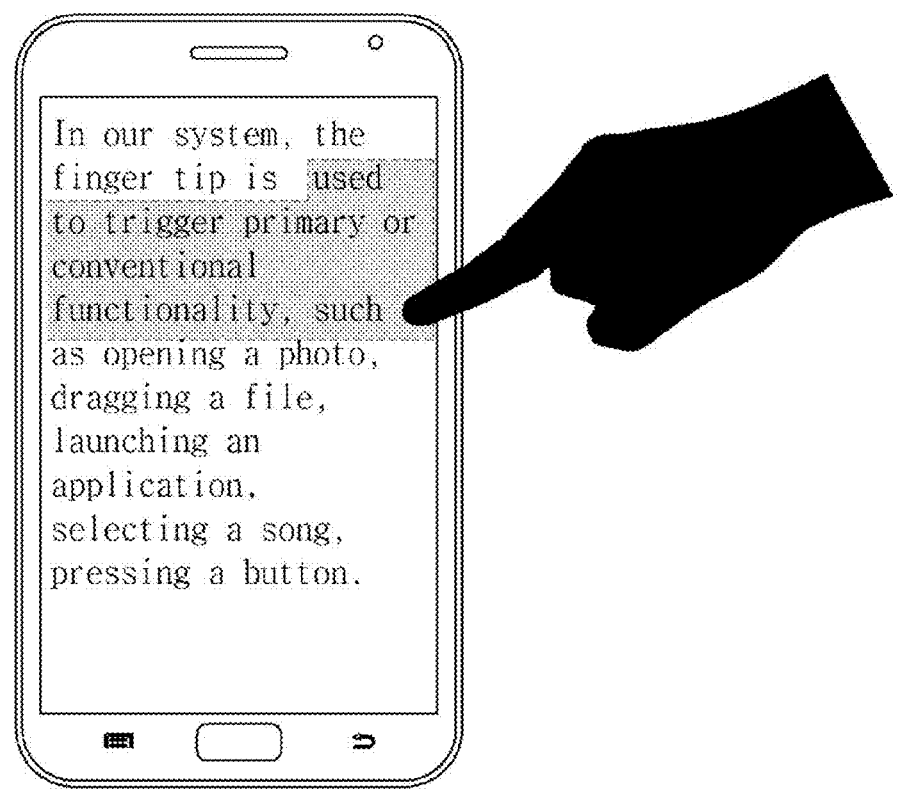
Figure 3E:
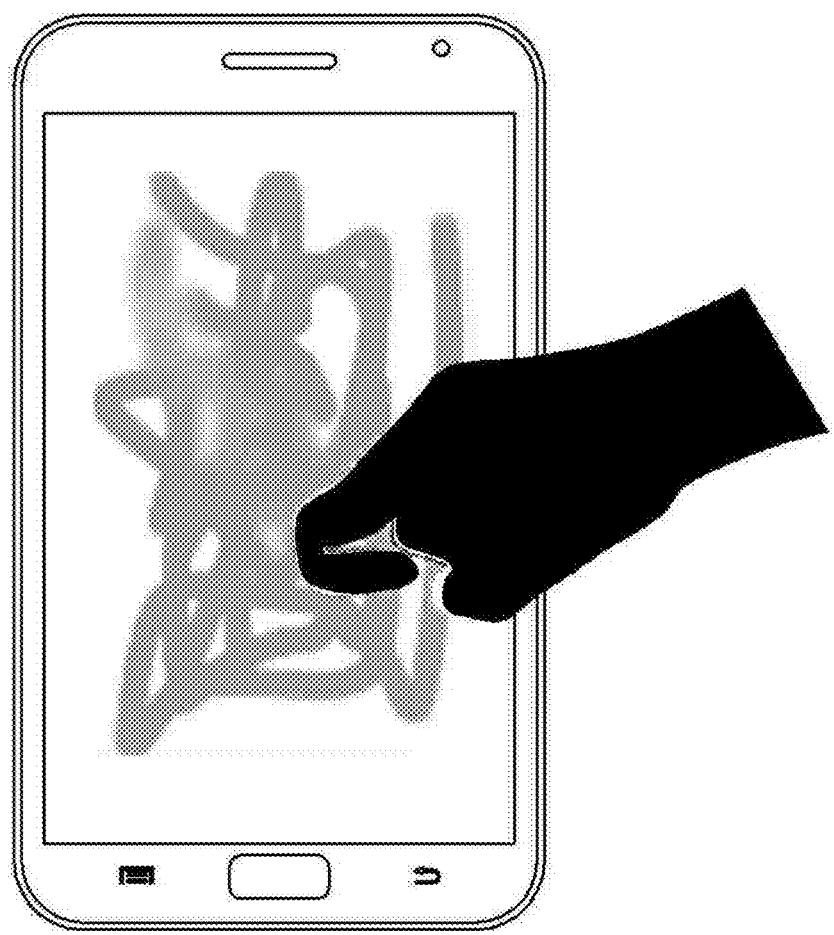

FIGS. 3A to 3E illustrate exemplary diagrams in which touches with the finger tip, knuckle and fingernail are used for different drawing actions in a drawing mode. In exemplary embodiment, the finger parts of the user are used as tools for different drawing actions in the drawing mode. For example, the fingertip may be used as a thick brush, the fingernail or knuckle as a fine marker, and the knuckle for erasing, as illustrated in FIGS. 3A, 3B, and 3C, respectively. Another exemplary configuration includes using the fingertip as a marker for highlighting the selected text region and the knuckle for smudging, as illustrated in FIGS. 3D and 3E, respectively.

Figure 4A:
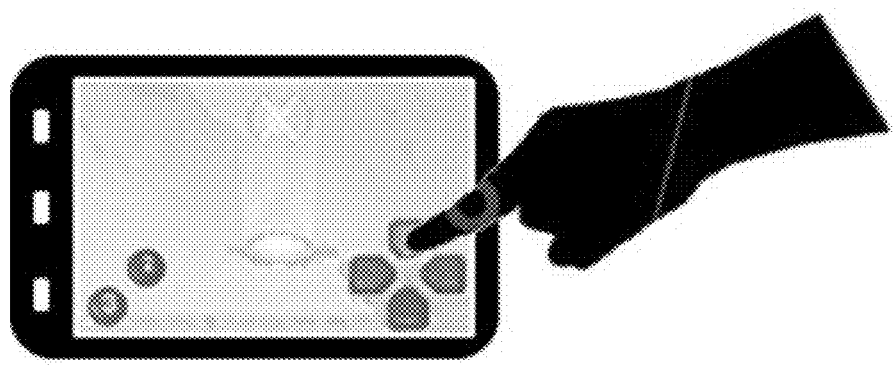
Figure 4B:
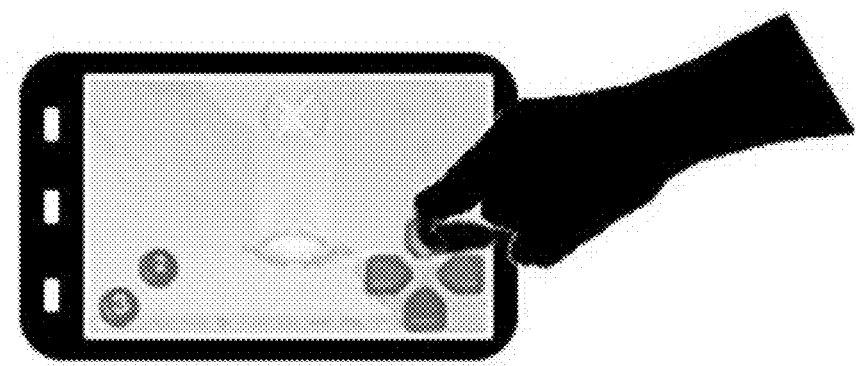

FIGS. 4A and 4B illustrate exemplary diagrams that the touches with the knuckle and fingernail can be used for auxiliary actions in games in concert with fingertip driven interactions.

As illustrated in FIG. 4A, using an onscreen movement control (e.g., virtual joy stick or arrow pad), a fingertip may be used for regular in-game character (i.e., player) movement. If a knuckle or fingernail is used, as illustrated in FIG. 4B, the directional player movement may be performed in a crouched position. As another example, a fingertip may be used for a primary weapon fire and a knuckle or fingernail for alternative weapon mode. Also, a touch with a fingernail may be used to run. In addition, a momentary tap of the knuckle or fingernail (i.e., a tap) may be used to jump an in-game character.

Figure 5:
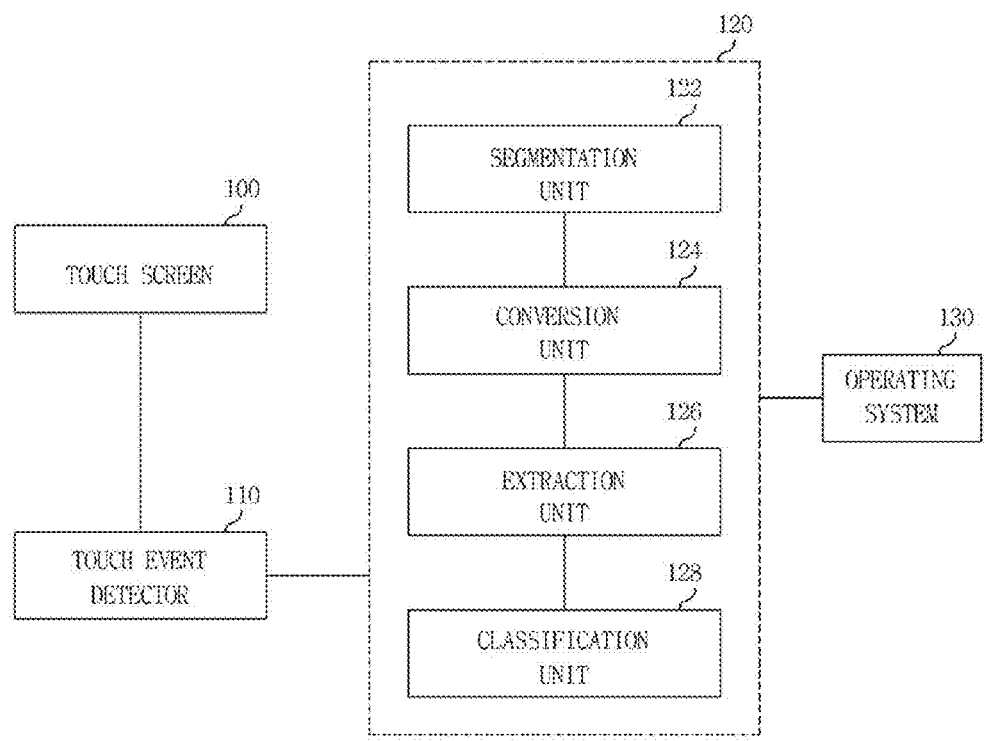
FIG. 5 is a block diagram of a computing system for activating different interactive functions based on a classification of vibro-acoustic signals in accordance with an exemplary embodiment of the present invention.

FIG. 5 is a block diagram of a computing system for distinguishing different interactive functions based on a classification of vibro-acoustic signals in accordance with an embodiment of the present invention.

The computing system of the embodiment may have an operating system (OS), and can run various types of services or applications, known as apps. The computing system may also be equipped with a telecommunication capability that can allow connections to communication network. Such a computing system may include, but not limited to, a table top computer (e.g., Surface Computing), laptop computer, desktop computer, mobile computer, mobile internet device, mobile phone, smart-phone, PDA (Personal Digital Assistant), game console, portable media player, and the like.

Referring to FIG. 5, the computing system includes a touch screen 100, a touch event detector 110, a vibro-acoustic classifier 120, and an OS 130.

The touch screen 100 is an electronic visual display and serves also an input/output device supplementing or substituted for a keyboard, a mouse, and/or other types of devices.

Figure 6:
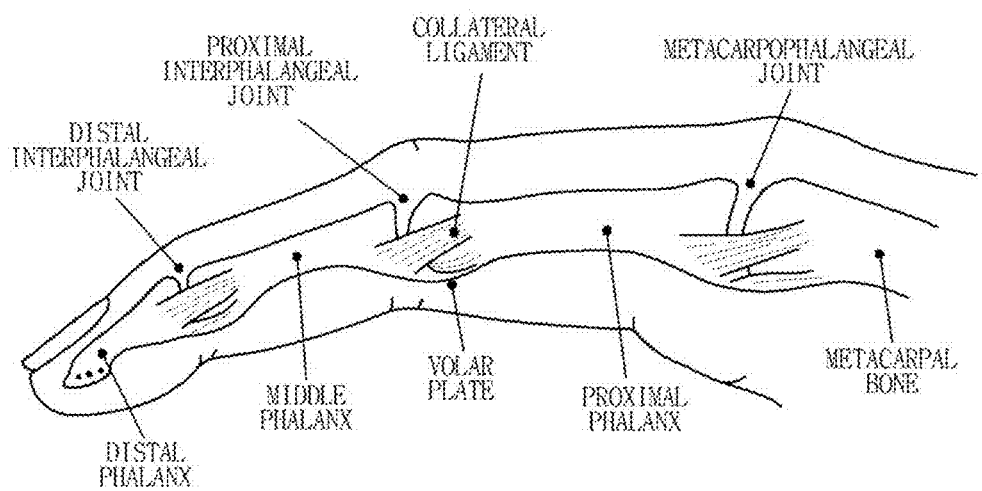
FIG. 6 illustrates an anatomical chart of finger parts for use in interacting with the computing system in accordance with an exemplary embodiment of the present invention.

The touch screen 100 displays one or more interactive elements such as graphical representation for services or applications designed to perform a specific function on the computing system. Touching the interactive elements with the finger parts of a user, beyond the conventional tip of the finger, causes the OS 130 to activate the application or service related to the interactive elements. As shown in FIG. 6, fingers are diverse appendages, both in their motor capabilities and their anatomical compositions. A single digit contains different parts such as one or more knuckles, a tip, pad, and fingernail.

The fingertip includes the fleshy mass on the palmar aspect of the extremity of the finger, as well as the finger sides up to the distal interphalangeal articulation. It also includes the very tip of the finger (i.e., the distal tip of the distal phalanx). However, the fingernail may not be included in an embodiment as part of fingertip definition, as this is an anatomically distinct feature and region.

The fingernail encompasses all parts of the keratin (or artificial nail material), horn-like envelope covering the dorsal aspect of the terminal phalanges of fingers. The knuckle includes the immediate areas surrounding the boney joints of human fingers, including joints on the thumb, and both major and minor knuckles. Specifically, the boney regions are within a 1 cm radius surrounding the metacarpophalangeal joints and interphalangeal articulations.

Figure 7:
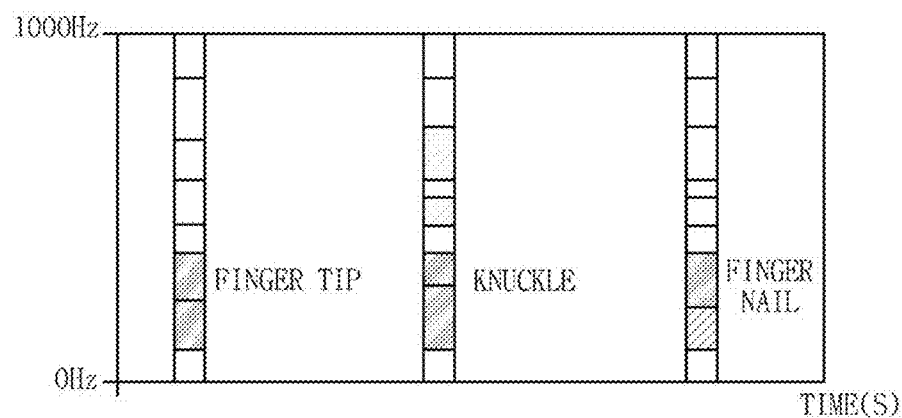
FIG. 7 shows a spectrogram of finger parts in accordance with an exemplary embodiment of the present invention.

When an object strikes a certain material, vibro-acoustic waves propagate outward through the material or along the surface of the material. Typically, interactive surfaces use rigid materials, such as plastic or glass, which both quickly distribute and faithfully preserve the signal. As such, when respective finger parts touch or contact the surface of the touch screen 100, vibro-acoustic responses are produced. The vibro-acoustic characteristics of the respective finger parts are unique, mirroring their unique anatomical compositions. For example, FIG. 7 illustrates a spectrogram of three types of the finger contact. As known from FIG. 7, the finger parts, that is, a fingertip, a knuckle, and a fingernail, produce different vibro-acoustic responses.

When a user wants to use an application or a service on the computing system, the user may touch an interactive element for the application or service with a finger part such as a fingertip, knuckle, or fingernail. Such a touch event results in the generation of a unique vibro-acoustic signal from the surface of the touch screen 100.

Referring back to FIG. 5, the touch event detector 110 detects the touch event entailing the vibro-acoustic signal. The touch event detector 110, for example, may be arranged at a rear side of the touch screen so that the vibro-acoustic signal caused by the touch event can be captured. The touch event detector 110 can be triggered by the onset of the vibro-acoustic signal resulting from the touch event. To capture the touch event and subsequent vibro-acoustic signal, the touch event detector 110 may include one or more impact sensors, vibration sensors, accelerometers, strain gauges, or acoustic sensors such as a condenser microphone, a piezoelectric microphone, MEMS microphone and the like. Once the vibro-acoustic signal has been captured by the touch event detector 110, the vibro-acoustic classifier 120 processes the vibro-acoustic signal to distinguish which finger part was used.

The OS 130 runs the computing system so that the primary function or the auxiliary function can be activated in line with the classification of the vibro-acoustic signals.

The vibro-acoustic classifier 120 includes a segmentation unit 122 to segment the vibro-acoustic signal into a digital representation; a conversion unit 124 to convert the digitized vibro-acoustic signal into an electrical signal; a feature extraction unit 126 derive a series of features from the electrical signal; and a classification unit 128 to classify the finger part using the features to distinguish what finger part was used for the touch event.

The segmentation unit 122 samples the vibro-acoustic signal, for example, at a sampling rate of 96 kHz, using a sliding window of 4096 samples of the vibro-acoustic signal. The conversion unit 124 then performs, for example, a Fourier Transform on sampled time-dependent vibro-acoustic signal to produce an electrical signal having frequency domain representation. For example, the Fourier Transform of this window may produce 2048 bands of frequency power.

The vibro-acoustic classifier 120 may further downsample this data into additional vectors (i.e., buckets of ten), providing a different aliasing. In addition, additional time-domain features may be calculated from the vibro-acoustic signal, such as the average absolute amplitude, total absolute amplitude, standard deviation of the absolute amplitude, the center of mass for both the segmented input signal and the Fourier Transformed signal, and zero crossings.

The feature extraction unit 126 may also calculate a series of features from the frequency domain representation of the vibro-acoustic signals, such as the fundamental frequency of the impact waveform.

The classification unit 128 classifies the vibro-acoustic signal using the features to distinguish what finger part was used to generate the touch event, so that the computing system to selectively activate a primary function or an auxiliary function related to the interactive element depending on the classified vibro-acoustic signals.

To aid classification, the user can provide supplemental training samples to the vibro-acoustic classifier 120.

In one exemplary embodiment, the classification unit 128 may be implemented with a support vector machine (SVM) for feature classification. The SVM is a supervised learning model with associated learning algorithms that analyze data and recognize patterns, used for classification and regression analysis.

While the present invention has been shown and described with respect to the exemplary embodiments, the present invention is not limited thereto. It will be understood by those skilled in the art that various changes and modifications may be made without departing from the scope of the present invention as defined in the following claims.

What is claimed is:

1. A system for classifying finger touch events, the system comprising:

a touch screen configured to display an interactive element;

one or more vibro acoustic sensors coupled to the touch screen;

a touch event detector configured to monitor the one or more vibro acoustic sensors and to save vibro-acoustic signals sensed by the one or more vibro acoustic sensors, wherein the touch event detector is further configured to detect touch events in which the interactive element is touched by a first or a second finger part from a plurality of finger parts of a user including a finger tip, a knuckle and a fingernail, and wherein the touch events result in generating the vibro-acoustic signals; and a vibro-acoustic classifier configured to classify the vibro-acoustic signals, wherein a first function or a second function related to the interactive element is selectively activated based on classification of the vibro-acoustic signals by the vibro-acoustic classifier.

2. The system of claim 1, wherein the touch event detector is triggered by the touch screen.

3. The system of claim 1, wherein the touch event detector is triggered by onset of the vibro-acoustic signal.

4. The system of claim 1, wherein a vibro-acoustic sensor is an impact sensor, a vibration sensor, an accelerometer, a strain gauge, or an acoustic sensor.

5. The system of claim 4, wherein the acoustic sensor is a condenser microphone, a piezoelectric microphone or a MEMS microphone.

6. The system of claim 1, wherein the vibro-acoustic signals saved by the touch event detector is transmitted to the vibro-acoustic classifier to enable the vibro-acoustic classifier to classify the vibro-acoustic signals.

7. The system of claim 6, wherein the vibro-acoustic classifier identifies whether the first finger part or the second finger part of the user is used to touch the interactive element based on classifying the vibro-acoustic signals.

8. The system of claim 7, wherein the touch events result in the generation of the vibro-acoustic signal from a surface of the touch screen.

9. The system of claim 8, wherein the touch event detector is arranged at a rear side of the touch screen.

10. The system of claim 6, wherein the vibro-acoustic classifier comprises:
a segmentation unit configured to segment the vibro-acoustic signals into a digital representation of the vibro-acoustic signals;
a conversion unit coupled to the segmentation unit and configured to convert the digital representation of the vibro-acoustic signals into electrical signals;
a feature extraction unit coupled to the conversion unit and configured to derive a series of features from the electrical signals; and
a classification unit coupled to the feature extraction unit and configured to use the series of features to distinguish whether a finger part used for the touch event is the first finger part or the second finger part.

11. The system of claim 10, wherein the segmentation unit is configured to sample the vibro-acoustic signals using a sliding window of samples of the vibro-acoustic signals.

12. The system of claim 11, wherein the conversion unit is configured to perform a Fourier Transform on the sampled vibro-acoustic signals having time domain representation to generate the electrical signals having frequency domain representation, and wherein the feature extraction unit is configured to calculate a series of features from the frequency domain representation of the electrical signals.

13. A method for classifying touch events, the method comprising:
displaying an interactive element of a touch screen;
monitoring one or more vibro acoustic sensors coupled to the touch screen to save vibro-acoustic signals sensed by the one or more vibro acoustic sensors;
detecting touch events in which the interactive element is touched by a first or a second finger part of a user, wherein the touch events result in generating the vibro-acoustic signals;
classifying the vibro-acoustic signals;
determining whether the first finger part or the second finger part from a plurality of finger parts is used to touch the interactive element on the touch screen based on classified vibro-acoustic signals, wherein the plurality of finger parts include a fingertip, a knuckle and a finger nail, and
activating a first function or a second function related to the interactive element based on determining whether the first finger part or the second finger part is used to touch the interactive element on the touch screen.

14. The method of claim 13, wherein classifying the vibro-acoustic signals comprises:
segmenting the vibro-acoustic signals into a digital representation of the vibro-acoustic signals;
converting the digital representation of the vibro-acoustic signals into electrical signals; and
deriving a series of features from the electrical signals.

15. The method of claim 14, wherein segmenting the vibro-acoustic signals comprise sampling the vibro-acoustic signals using a sliding window of samples of the vibro-acoustic signals.

16. The method of claim 15, wherein converting the digital representation of the vibro-acoustic signals comprises performing a Fourier Transform on sampled vibro-acoustic signals having time domain representation to generate the electrical signals having frequency domain representation.

17. The method of claim 16, wherein deriving the series of features comprise calculating a series of features from the frequency domain representation of the electrical signals, and distinguishing whether a finger part used for the touch event is the first finger part or the second finger part based on the series of features.

18. A non-transitory computer readable medium containing instructions for classifying touch events, wherein execution of the program instructions by a processor causes the processor to carry out the steps of:
displaying an interactive element of a touch screen;
monitoring one or more vibro acoustic sensors coupled to the touch screen to save vibro-acoustic signals sensed by the one or more vibro acoustic sensors;
detecting touch events in which the interactive element is touched by a first or a second finger part of a user from a plurality of finger parts including a fingertip, a knuckle and a finger nail, wherein the touch events result in generating the vibro-acoustic signals;
classifying the vibro-acoustic signals;
determining whether the first finger part or the second finger part is used to touch the interactive element on the touch screen based on classified vibro-acoustic signals, and
activating a first function or a second function related to the interactive element based on determining whether the first finger part or the second finger part is used to touch the interactive element on the touch screen.

* * * * *